Sept. 26, 1961   R. E. CARVILL   3,001,296
DOCTOR ARRANGEMENT
Filed Aug. 18, 1958
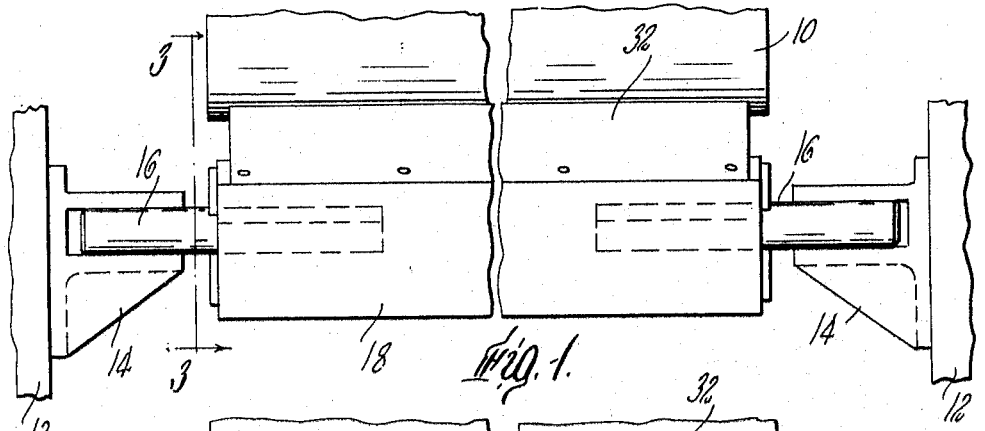
Fig. 1.
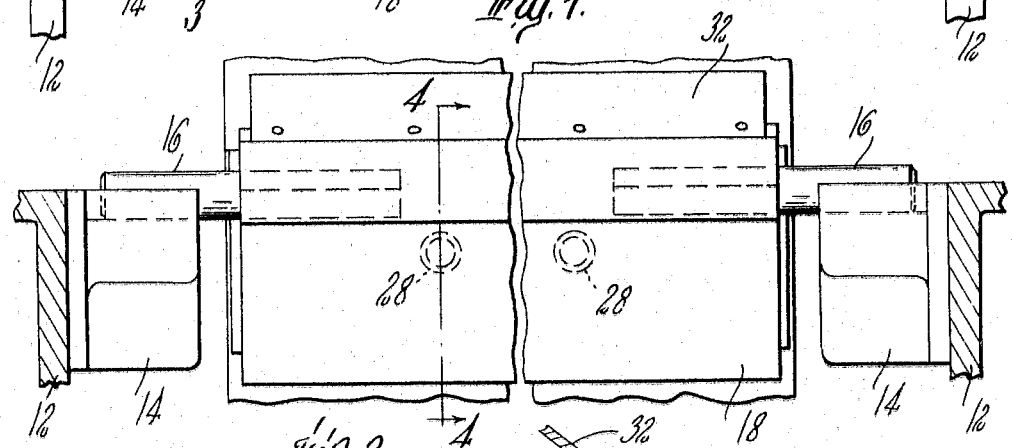
Fig. 2.
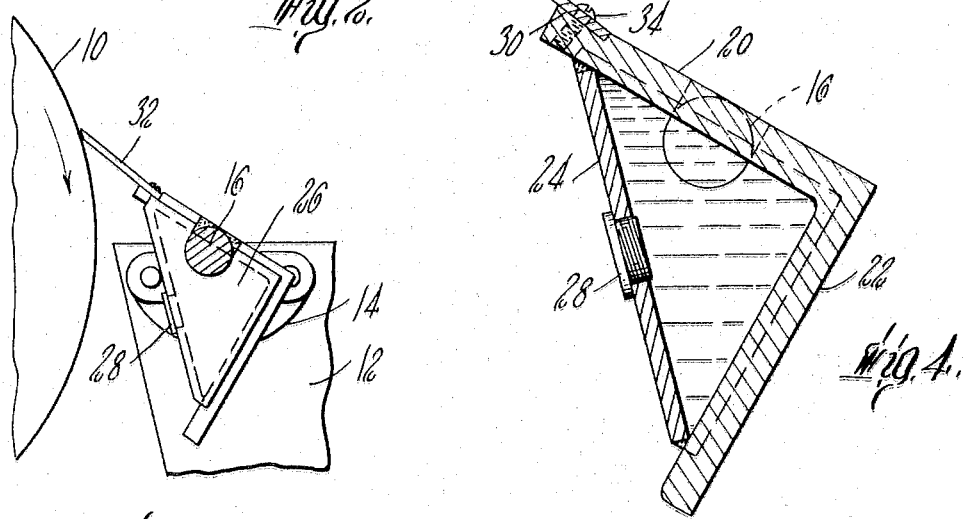

3,001,296
DOCTOR ARRANGEMENT

Richard E. Carvill, Dedham, Mass., assignor to Bird Machine Company, South Walpole, Mass., a corporation of Massachusetts
Filed Aug. 18, 1958, Ser. No. 755,464
7 Claims. (Cl. 34—85)

This invention relates to a doctor arrangement for use in doctoring heated surfaces and pertains more specifically to an improved doctor blade support for use in doctoring heated rolls in paper machines.

Doctor blades have long been used in paper machinery to maintain a clean surface on the heated rolls over which the freshly formed paper web passes. The doctor blade itself is a relatively thin strip of metal which requires external support in order to prevent sagging or bending of the blade along its length under the influence of gravity so as to provide uniform contact pressure between the blade and the roll surface throughout the length of the blade. Supports which are conventionally employed for providing rigidity to the doctor blades take a variety of forms, one of the common supports being simply an angle beam having an L-shaped cross-sectional configuration. The beam commonly is supported on pivotal mountings adjacent each of its ends so that it extends across the face of the roll. While even a relatively heavy and rigid angle beam of this sort does sag slightly between its supports, the sag can be planed out to provide a seat for the doctor blade itself which is completely straight and parallel with the surface of the roll. It is found, however, that when such doctor supports are put in use, the heat radiated from the heated surface of the roll raises the temperature of the angle beam non-uniformly because of the fact that the margins of the webs of the beam are closer to the heated face of the roll than is the angular intersection of the two webs. The non-uniform heating of the beam causes warping and distortion thereof, so that the originally uniform contact pressure between the doctor blade and roll face is distorted and made non-uniform. Attempts to solve the problem by providing a circulating heat-exchange liquid for controlling the temperature of the angle beam have proved unsuccessful and indeed have frequently made the warpage worse.

One object of the present invention is to provide an improved doctor blade support for use in doctoring a heated surface, which support is extremely resistant to warping upon substantial changes in temperature.

Another object is to provide an improved doctoring arrangement particularly adapted for use on heated surfaces with a minimum of warping.

A further object is to provide a hollow, hermetically-sealed, liquid-filled supporting member for doctor blades which is substantially non-warping upon use adjacent to a heated roll.

Other and further objects will be apparent from the drawing and from the description which follows.

In the drawing:

FIG. 1 is a plan view of one embodiment of the present invention;

FIG. 2 is a view in front elevation of the embodiment shown in FIG. 1;

FIG. 3 is a view in section along line 3—3 of FIG. 1; and

FIG. 4 is a view in section taken along line 4—4 of FIG. 2.

The illustration in the drawing shows one embodiment of the present invention applied to a paper-making machine. As appears in FIG. 1 the machine includes a conventional roll 10 which is internally heated by steam or by any suitable means and is mounted for rotation on main frame 12, 12. Brackets 14, 14 are secured to the frame members 12, 12 in advance of the breast roll 10 providing journal bearings for stub shafts 16, 16 fixed to and extending outwardly from opposite ends of a doctor blade supporting member 18. The doctor blade supporting member 18 consists of an angle beam having two webs 20, 22 extending at right angles to each other so that the angle beam has an L-shaped cross-sectional configuration, as appears best in FIG. 4. Stub shafts 16, 16 are welded into slots cut in one web 20. Extending between the two free margins of webs 20, 22 is a wall 24 which may be secured in place by welding or by any other suitable means and which forms with the angle beam an elongated chamber or hollow girder of generally triangular cross-sectional configuration. End plates 26, 26, which may be simply triangular pieces of sheet metal with a cut-away portion for shaft 16, are secured in place as by welding to seal the open ends of the elongated hollow chamber so that the chamber is hermetically sealed. A pair of screw-threaded filler plugs 28, 28 provide means for introducing a heat-exchange liquid, preferably an aqueous liquid such as water, into the interior of the chamber. A seat 30 is provided, for example by planing or milling along one margin of the angle beam supporting member, to which doctor blade 32 is secured by means of bolts 34, 34.

The interior of the hollow chamber or hollow girder which serves as supporting member 18 is filled with water or other suitable liquid prior to placing the device in use and screw plugs 28, 28 are firmly closed, so that the water is hermetically sealed within the interior of the chamber or girder. The device is then employed in the same fashion as any conventional doctor arrangement. If desired, suitable means may be provided for tilting the support member 18 and its attached doctor blade 32 about their longitudinal axis in the bearings of brackets 14, 14. It will also be understood that any conventional reciprocating means may be employed to provide lengthwise reciprocation of the doctor blade during use should that be desired.

It is found that in the case of a device constructed in accordance with the present invention the clearance between the blade and the face of the roll remains uniform to within as little as 0.001 inch throughout its length, which may be as much as 10 feet or more, when the temperature of the roll is raised from room temperature to an operating temperature well above 200° F. On the other hand, when the same beam is employed without wall 24 and without any water filling, clearances between the doctor blade and the roll at the ends of the blade varied as much as 0.020 inch when the temperature was raised from room temperature to operating temperature. When wall 24 was put in place and cold water was circulated through the hollow chamber, the fluctuation in clearance at the ends of the blade as the temperature was changed from room temperature to operating temperature was even greater.

It will be understood that the principle of the present invention may be employed satisfactorily with a variety of hollow girders having various cross-sectional configurations. The embodiment shown in the drawings is one of the simplest and least expensive to manufacture which at the same time provides highly satisfactory results.

Although specific embodiments of the invention have been described herein, it is not intended to limit the invention solely thereto, but to include all of the obvious variations and modifications within the spirit and scope of the appended claims.

What is claimed is:

1. A support for a doctor blade for use in doctoring a heated surface which comprises an elongated hollow chamber having rigid walls and means for pivotally supporting said chamber adjacent its ends, said chamber having sufficient longtiudinal rigidity to support said doctor blade against substantial sagging under the influence of gravity, a mass of liquid substantially filling said chamber, and means for normally sealing said liquid mass in said chamber.

2. A support as defined in claim 1 in which said liquid comprises water.

3. A support as defined in claim 1 in which said chamber is of triangular cross-sectional configuration.

4. A doctor arrangement for use in doctoring a heated surface which comprises an elongated supporting member mounted adjacent its ends for pivotal movement about a longitudinal axis, said member having a hollow polygonal cross-sectional configuration, a mass of liquid substantially filling the hollow interior of said member and sealed therewithin, the walls of said member having sufficient longitudinal rigidity to be self-supporting against substantial sagging under the influence of gravity, means for normally sealing said liquid mass within the interior of said member, and a doctor blade mounted along a side of said supporting member with its operative edge projecting beyond said side toward said heated surface.

5. A doctor arrangement as defined in claim 4 in which said liquid is an aqueous liquid and said supporting member has a triangular cross-sectional configuration.

6. A doctor arrangement for use in doctoring a heated roll which comprises an angle beam supporting member of L-shaped cross-sectional configuration pivotally mounted adjacent its ends for rotation about a longitudinal axis, a doctor blade mounted along one margin of said beam and extending therefrom in position to doctor the surface of said roll, and an imperforate wall extending between the margins of the two webs of said beam to form therewith an elongated chamber of generally triangular cross-sectional configuration, means for sealing the open ends of said chamber, and a mass of liquid substantially filling said chamber and hermetically sealed therein.

7. A doctor arrangement for use with a heated roll which comprises a hollow liquid-filled hermetically sealed girder having means adjacent each end for pivotally supporting said girder adjacent the face of said roll, and means along a margin of said girder for mounting a doctor blade with its operative edge extending laterally from said girder toward the face of said roll, the walls of said girder in contact with said liquid having sufficient longitudinal rigidity in themselves to support said doctor blade in operating position aganst substantial sagging under the influence of gravity on said liquid-filled girder.

References Cited in the file of this patent

UNITED STATES PATENTS

| 1,353,980 | Yahn | Sept. 28, 1920 |
| 1,566,358 | White | Dec. 22, 1925 |
| 2,209,257 | Blank | July 23, 1940 |
| 2,352,220 | Overton | June 27, 1944 |
| 2,376,502 | Overton | May 22, 1945 |

FOREIGN PATENTS

| 484,652 | Canada | July 8, 1952 |